(12) United States Patent
Dogukan et al.

(10) Patent No.: US 12,166,621 B2
(45) Date of Patent: Dec. 10, 2024

(54) DUAL CARRIER INDEX MODULATION (DC-IM)

(71) Applicants: Vestel Elektronik Sanayi ve Ticaret A. S., Manisa (TR); Koc University, Sariyer (TR)

(72) Inventors: Ali Tugberk Dogukan, Sariyer (TR); Ertugrul Basar, Sariyer (TR); Basak Ozbakis, Manisa (TR)

(73) Assignees: Vestel Elektronik Sanayi ve Ticaret A. S., Manisa (TR); Koc University, Sariyer (TR)

( * ) Notice: Subject to any disclaimer, the term of this patent is extended or adjusted under 35 U.S.C. 154(b) by 58 days.

(21) Appl. No.: 18/249,778

(22) PCT Filed: Oct. 19, 2021

(86) PCT No.: PCT/EP2021/078968
§ 371 (c)(1),
(2) Date: Apr. 20, 2023

(87) PCT Pub. No.: WO2022/084326
PCT Pub. Date: Apr. 28, 2022

(65) Prior Publication Data
US 2023/0388172 A1    Nov. 30, 2023

(30) Foreign Application Priority Data

Oct. 22, 2020    (EP) .................................... 20203407

(51) Int. Cl.
*H04L 27/28*    (2006.01)
*H04L 27/26*    (2006.01)
(52) U.S. Cl.
CPC .......... *H04L 27/28* (2013.01); *H04L 27/2602* (2013.01)

(58) Field of Classification Search
CPC ........................... H04L 27/28; H04L 27/2602
See application file for complete search history.

(56) References Cited

U.S. PATENT DOCUMENTS

2021/0359777 A1*  11/2021  Ozturk ................ H04L 27/2607

FOREIGN PATENT DOCUMENTS

| CN | 109688083 A | * | 4/2019 | .......... H04L 1/0071 |
|---|---|---|---|---|
| CN | 110445737 A | * | 11/2019 | |
| WO | 2016023517 A1 | | 2/2016 | |

OTHER PUBLICATIONS

Mao et al., Dual-Mode Index Modulation Aided OFDM, IEEE Access, Aug. 2016, vol. 5, pp. 50-60 (Year: 2016).*

(Continued)

*Primary Examiner* — Freshteh N Aghdam
(74) *Attorney, Agent, or Firm* — The Webb Law Firm (57) ABSTRACT

Methods and techniques are described for increasing data rate at a high error performance in wireless transmission. A plurality of groups of p bits, wherein p is an integer greater than 1, is obtained. A transmission signal is generated, which includes, for a group of p bits dividing the group of p bits into a first subgroup of $p_1$ bits and a second subgroup of $p_2$ bits, wherein $p_1$ and $p_2$ are integers greater than zero. Based on the $p_1$ bits, a sequence of modulation schemes is selected from a plurality of predetermined sequences of modulation schemes. The predetermined sequences are mutually different, and each of the predetermined sequences has length R, wherein R is an integer greater than 1. The $p_2$ bits onto R subcarriers are mapped respectively by means of the R modulation schemes of the selected sequence. Finally, the generated transmission signal is transmitted.

15 Claims, 6 Drawing Sheets

(56) References Cited

OTHER PUBLICATIONS

Li et al., "OFDM Spread Spectrum with Index Modulation", 2017 IEEE Globecom Workshops, 2017, pp. 1-6.
Mao et al., "Dual-Mode Index Modulation Aided OFDM", IEEE Access, 2016, vol. 5, pp. 50-60.
Thanh et al., "Repeated Index Modulatin for OFDM with Space and Frequency Diversity", 2017 International Conference on Advanced Technologies, IEEE, 2017, pp. 97-102.

* cited by examiner

DUAL CARRIER INDEX MODULATION (DC-IM)

CROSS-REFERENCE TO RELATED APPLICATIONS

This application is the United States national phase of International Application No. PCT/EP2021/078968 filed Oct. 19, 2021, and claims priority to European Patent Application No. 20203407.0 filed Oct. 22, 2020, the disclosures of each of which are hereby incorporated by reference in their entireties.

BACKGROUND

Field

The present disclosure relates generally to communication, and, in some particular embodiments, to techniques for transmission of signals using index modulation.

Technical Considerations

Wireless communication has been advancing over several decades now. Global communication systems as well as local network systems have been recently using technology based on Orthogonal Frequency Division Multiplexing (OFDM).

In OFDM, data symbols are simultaneously transmitted over a plurality of subcarriers. Data symbol here refers to a modulation symbol which may carry one or more data bits, depending on a modulation order. Simultaneously means within one OFDM symbol. An OFDM symbol is obtained by mapping the modulation symbols onto subcarriers of the transmission band and by then transforming the subcarriers by an inverse Fourier transformation (IFFT), or in general by an inverse orthogonal transformation. The OFDM symbol—now in time domain—is then provided for transmission. Before the transmission, still further operations may be used, such as operations in connection with multiple input multiple output (MIMO) processing or some further signal processing. The transmission may further include one or more of pulse shaping, amplification, and modulation onto the appropriate carrier frequency.

A total $N \log_2 M$ number of bits can be transmitted for each OFDM symbol, where N and M are the number of subcarriers in a resource unit (RU) and the modulation order, respectively. Resource unit is a unit of allocable resources. For example, a minimum allocable resource unit may include a plurality of subcarriers in one or more OFDM symbols (corresponding to intervals in time domain). Here, the spectral efficiency of an OFDM system can be given as $\log_2 M$. In IEEE (Institute of electrical and electronics engineers) 802.11 (Wi-Fi) standards, for example in IEEE 802.1 lax (Wi-Fi 6), different modulation and coding schemes (MCSs) are defined with varying modulation order and coding rate. For example, MCS0 is a scheme with binary phase shift keying (BPSK) (M=2) and ½ coding rate. In MCS0, only $\log_2 M = 1$ bit can be transmitted per subcarrier. Hence, this scheme may be used when the channel conditions are bad or the received signal strength is low. Dual carrier modulation (DCM), which modulates the same incoming bits over a pair of subcarriers with a same or different constellation, has been introduced to further improve the reliability. However, one of the major drawbacks of DCM is that it reduces the data rate by half.

Increasing the data rate of methods like DCM while still providing a high error performance is a challenging task.

SUMMARY

Methods and techniques are described for enabling a high data rate and error performance by using index modulation.

For example, a method is provided for wireless transmission, the method comprising the steps of: obtaining a plurality of groups of p bits, wherein p is an integer greater than 1; generating a transmission signal comprising, for a group of p bits: (i) dividing the group of p bits into a first subgroup of $p_1$ bits and a second subgroup of $p_2$ bits, wherein $p_1$ and $p_2$ are integers greater than zero; (ii) selecting, based on the $p_1$ bits, a sequence of modulation schemes from a plurality of predetermined sequences of modulation schemes, wherein: the predetermined sequences are mutually different, each of the predetermined sequences has length R, and R is an integer greater than 1; and mapping the $p_2$ bits onto R subcarriers respectively by means of the R modulation schemes of the selected sequence; and transmitting the generated transmission signal.

Furthermore, a method is provided for wireless reception, the method comprising the steps of: receiving a transmission signal; and obtaining, from the received signal, $p=p_1+p_2$ bits, wherein $p_1$ and $p_2$ are integers greater than zero, comprising determining, by performing maximum likelihood estimation on the received transmission signal a first subgroup of $p_1$ bits and a second subgroup of $p_2$ bits, wherein: (i) the $p_2$ bits are mapped onto R subcarriers respectively by means of R modulation schemes of a sequence of modulation schemes, wherein R is an integer greater than 1; and (ii) the sequence is a sequence of a plurality of predetermined sequences of modulation schemes, wherein: the predetermined sequences are mutually different, each of the predetermined sequences has length R and indicates the $p_1$ bits.

According to an embodiment, a transmitting device is provided. The device comprises circuitry configured to: obtain a plurality of groups of p bits, wherein p is an integer greater than 1; generate a transmission signal comprising, for a group of p bits: (i) divide the group of p bits into a first subgroup of $p_1$ bits and a second subgroup of $p_2$ bits, wherein $p_1$ and $p_2$ are integers greater than zero; (ii) select, based on the $p_1$ bits, a sequence of modulation schemes from a plurality of predetermined sequences of modulation schemes, wherein: the predetermined sequences are mutually different, each of the predetermined sequences has length R, and R is an integer greater than 1; and (iii) map the $p_2$ bits onto R subcarriers respectively by means of the R modulation schemes of the selected sequence; and a transmitter configured to transmit the generated transmission signal.

According to an embodiment, a receiving device is provided, comprising a receiver configured to receive a transmission signal; and circuitry configured to: obtain, from the received signal, $p=p_1+p_2$ bits, wherein $p_1$ and $p_2$ are integers greater than zero, comprising determining, by performing maximum likelihood estimation on the received transmission signal a first subgroup of $p_1$ bits and a second subgroup of $p_2$ bits, wherein: the $p_2$ bits are mapped onto R subcarriers respectively by means of R modulation schemes of a sequence of modulation schemes, wherein R is an integer greater than 1; and the sequence is a sequence of a plurality of predetermined sequences of modulation schemes, wherein: the predetermined sequences are mutually different, each of the predetermined sequences has length R and indicates the $p_1$ bits.

The above mentioned circuitry may be any circuitry such as processing circuitry comprising one or more processors and/or other circuitry elements.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

An understanding of the nature and advantages of various embodiments may be realized by reference to the following figures.

Like reference numbers and symbols in the various figures indicate like elements, in accordance with certain example implementations.

Description

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Figure 1:
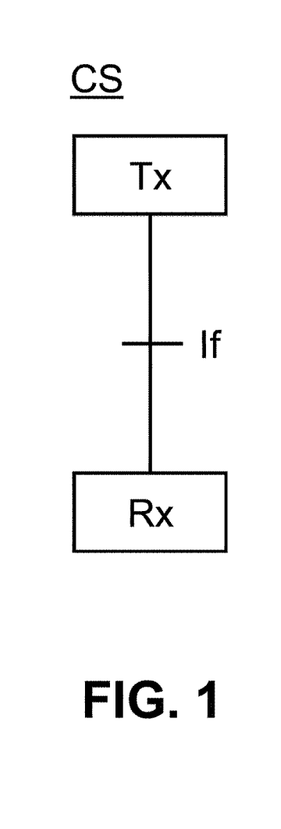
FIG. 1 is a block diagram illustrating a communication system.

FIG. 1 illustrates an exemplary communication system CS in which Tx represents a transmitter and Rx represents a receiver. The transmitter Tx is capable of transmitting a signal to the receiver Rx over an interface If. The interface may be, for instance, a wireless interface. The interface may be specified by means of resources, which can be used for the transmission and reception by the transmitter Tx and the receiver Rx. Such resources may be defined in one or more (or all) of the time domain, frequency domain, code domain, and space domain. It is noted that in general, the "transmitter" and "receiver" may be also both integrated in the same device. In other words, the devices Tx and Rx in FIG. 1 may respectively also comprise the functionality of the Rx and Tx.

The present disclosure is not limited to any particular transmitter Tx, receiver Rx and/or interface If implementation. However, it may be applied readily to some existing communication systems as well as to the extensions of such systems, or to new communication systems. Exemplary existing communication systems may be, for instance the 5G New Radio (NR) in its current or future releases, and/or the IEEE 802.11 based systems such as the recently studied IEEE 802.11 be or the like.

As mentioned in the background section, OFDM is a currently rather popular wideband multi-carrier transmission technology and has been used in many standards such as IEEE 802.11 (Wi-Fi), LTE (Long Term Evolution, which is a mobile communication system of 4th generation, 4G), New Radio (NR, which belongs to $5^{th}$ generation, 5G). In OFDM, frequency band is divided into subbands and these bands are called subcarriers. The data symbols, which are obtained by mapping incoming bits with a constellation, are transmitted simultaneously over these subcarriers. A certain number of subcarriers forms a resource unit (RU). For example, an RU may comprise 26, 52, 106, 242, 484 or 996 subcarriers. In Wi-Fi standards such as IEEE 802.11ax (Wi-Fi 6), there are several MCSs which allow to adjust the data rate and communication range. For example, MCS0 corresponds to BPSK with ½ coding rate and it provides the most reliable communication and the lowest data rate among all MCSs. To further extend the communication range and to improve the error performance in Wi-Fi, DCM has been introduced in the expense of reducing the data rate by half. It is noted that the present disclosure can readily be applied to OFDM systems, but is not limited thereto. It is conceivable that the present disclosure may be applied in general to other schemes such as frequency division multiplexing (FDM). The OFDM or the FDM is not limited to using FFT, but may use discrete Fourier transformation (DFT) or other transformations. At the receiver side, the time domain signal is received. Samples belonging to an OFDM symbol are transformed by a (forward) transformation such as fast Fourier transformation or the like. Thereby, modulation symbols mapped onto the subcarriers are obtained and de-mapped.

DCM is a modulation scheme which may be applied to OFDM based transmission methods. DCM has been involved in IEEE 802.11 ax standard and applied with MCSs 0, 1, 3, and 4. In DCM, an RU with size N (e.g., N subcarriers) is divided into two parts.

Figure 2:
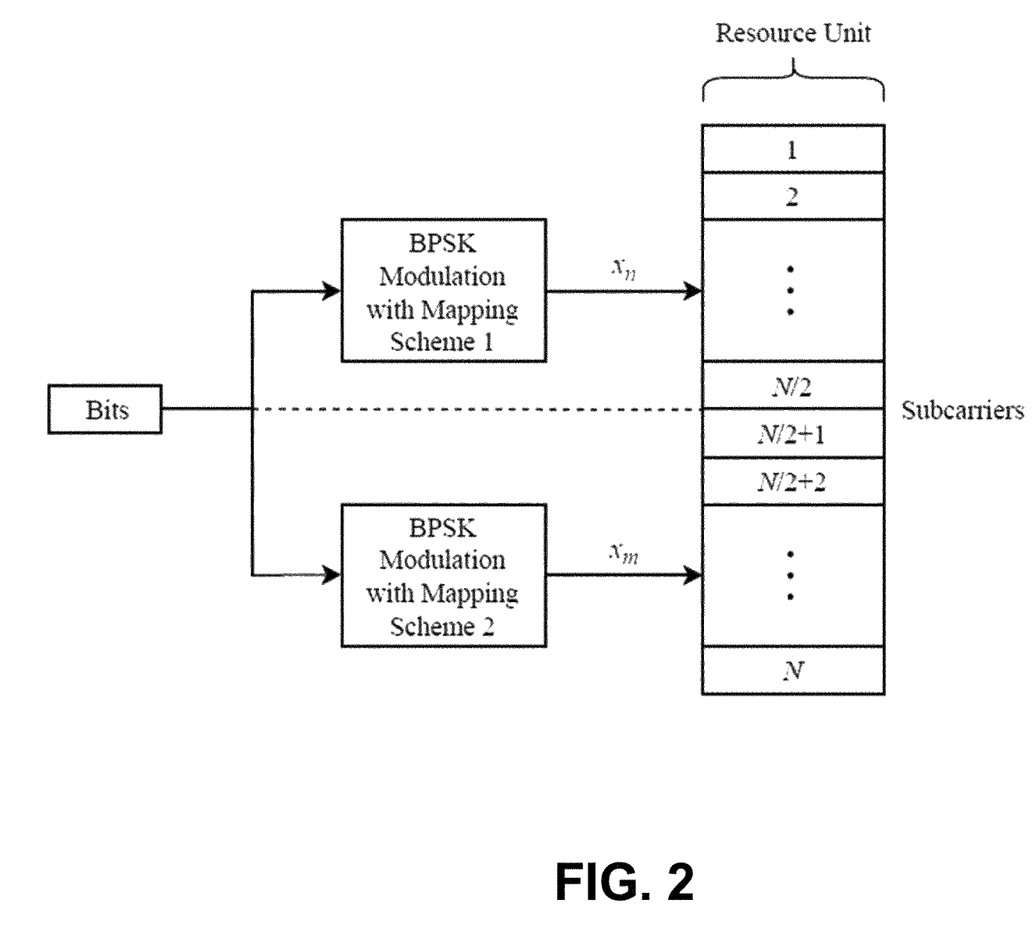
FIG. 2 is a schematic drawing illustrating the mapping on Resource Units according to DCM.

FIG. 2 illustrates an exemplary mapping scheme of DCM-MCS0, i.e. DCM based on BPSK.

As illustrated in FIG. 2, data symbols (x_n and x_m) of the first and second half of the RU are determined by the same incoming bits to provide frequency diversity, where $n \in \{1, \ldots, N/2\}$ and $m=N/2+n$ are the subcarrier indices for the first and second half of the RU, respectively. Note that the same or different modulation schemes can be used for mapping the incoming bits onto the data symbols of the first and the second half of the RU. The term modulation here refers to mapping of one or more bits onto a signal point out of a plurality of signal points given by the modulation scheme. Arrangement of the signal points in the modulation scheme is sometimes also referred to as constellation. In case of BPSK, one bit of data is mapped onto one data symbol (modulation symbol). In the BPSK, the two possible signal points are typically antipodal, and represent two respective phases differing from each other by pi (180°).

More specifically, according to DCM-MCS0, N/2 groups of bits are mapped respectively onto the first N/2 subcarriers (e.g., the first N/2 subcarriers, when the subcarriers are ordered according to their index). Furthermore, the same N/2 groups of bits are mapped respectively onto the second N/2 subcarriers (e.g., the last N/2 subcarriers, when the subcarriers are ordered according to their index). In this case, as BPSK mapping is applied, the group size is one, meaning that each of the N/2 groups comprises one bit. In other words, N input bits are split into two branches. In the first branch, the N/2 bits are mapped by means of a first BPSK mapping to the data symbols x_n, whereas in the second branch, the remaining N/2 bits are mapped by means of a second BPSK mapping to the data symbols x_m.

Since DCM transmits the same information over two different subcarriers of OFDM, it provides reliable communication and extends the communication range. However, for the same reason, the conventional DCM method halves the data rate of any MCS, which is very important metric in wireless communication networks.

Data rate is one of important metrics for efficiency in the existing wireless communication networks. However, as the data rate increases in a system, the error performance typically gets worse. As previously mentioned, in Wi-Fi technology such as IEEE 802.11ax, there are several MCSs to adjust the data rate and the reliability. For example, MCS0 is the most reliable scheme; nevertheless, its data rate is low compared to schemes with higher layer modulations. The DCM technique may improve the reliability of MCSs and so it may also increase the communication range. However, it may decrease the data rate. In future wireless communication technologies, which aim to provide very high data rates, such as IEEE 802.11 be, it would be desirable to avoid or reduce the decrease in data rate. In the disclosed subject matter, this drawback of DCM is overcome, while still providing close error performance to DCM.

Figure 3A:
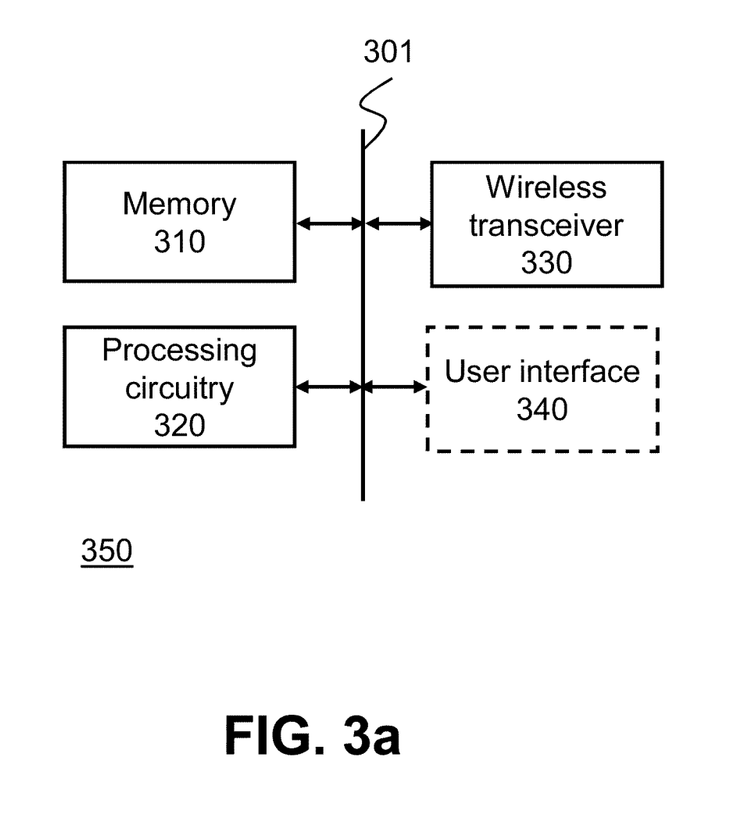
FIG. 3a is a block diagram illustrating a transmitting device.

FIG. 3a illustrates a transmitting device 350 according to some exemplary embodiments. The transmitting device 350 may be a part of any wireless communication device such as STA or AP, or, in general base station or terminal. The transmitting device 350 comprises memory 310, processing circuitry 320, and a wireless transceiver 330 (or a wireless transmitter 330), which may be capable of communicating with each other via a bus 301. The transmitting device 350 may further comprise a user interface 340. However, for some applications, the user interface 340 is not necessary (for instance some devices for machine-to-machine communications or the like).

The memory 310 may store a plurality of firmware or software modules, which implement some embodiments of the present disclosure. The memory may 310 be read from by the processing circuitry 320. Thereby, the processing circuitry may be configured to carry out the firmware/software implementing the embodiments. The processing circuitry 320 may comprise one or more processors, which, in operation, obtain a plurality of groups of p bits and generate a transmission signal. The generation of the transmission signal comprises, for a group of p bits (or for each group of p bits of the plurality of groups of p bits): i) dividing the group of p bits into a first subgroup of $p_1$ bits and a second subgroup of $p_2$ bits; ii) selecting, based on the $p_1$ bits, a sequence of modulation schemes from a plurality of predetermined sequences of modulation schemes, wherein the predetermined sequences are mutually different, each of the predetermined sequences has length R, and R is an integer greater than 1; and iii) mapping the $p_2$ bits onto R subcarriers respectively by means of the R modulation schemes of the selected sequence. The wireless transceiver 330, in operation, transmits the generated transmission signal.

Figure 4A:
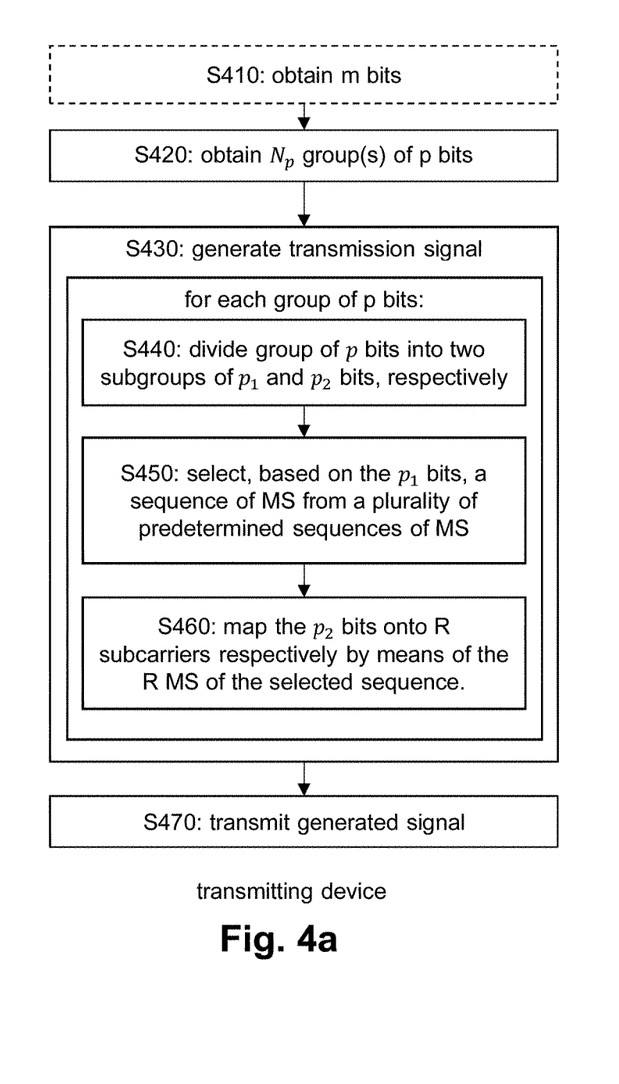
FIG. 4a is a flow diagram illustrating exemplary steps performed by a transmitting device.

In correspondence with the above described transmitting device, a communication method for wireless transmission(s) to be performed by a transmitting device is provided. As illustrated in FIG. 4a, the method comprises the step S420 of obtaining a plurality of groups of p bits. The method further comprises a step S430 of generating a transmission signal comprising, for a group of p bits (or for each group of p bits of the plurality of groups of p bits), i) dividing S440 the group of p bits into a first subgroup of $p_1$ bits and a second subgroup of $p_2$ bits, ii) selecting S450, based on the $p_1$ bits, a sequence of modulation schemes (MS) from a plurality of predetermined sequences of modulation schemes, and iii) mapping S460 the $p_2$ bits onto R subcarriers respectively by means of the R modulation schemes of the selected sequence. Moreover, the method comprises a step S470 of transmitting the generated S430 transmission signal. Furthermore, the method may comprise a step S410 of obtaining m bits. The group(s) of p bits may then be obtained in step S420 from the m bits as described below.

The generating S430 of the transmission signal may further comprise performing the OFDM and/or further digital processing (such as MIMO) and analog processing (such as one or more of pulse shaping, power amplification, pre-distortion, modulation onto the designated frequency carrier of the system or the like).

It is noted that, in the present disclosure, m and p are in general an integer (or natural numbers) greater than 1; and $p_1$ and $p_2$ are integers greater than 0. It is further noted that the terms "group of xxx bits" and "xxx bits" are used interchangeably and refer to a sequence of 0 and 1 with length "xxx". In other words, a group of "xxx bits" may consist of the "xxx bits".

In general, the p bits may be obtained from a number m of bits. The m bits may, for instance, be obtained from a higher layer or from a preceding processing which may comprise one or more of forward error correction coding, rate matching, interleaving or the like. These m bits may be divided (or split) into groups of p bits according to some predetermined pattern. E.g., the first p bits of the m bits may be put into the first group of p bits, and so forth (more specifically, the n-th group of p bits would comprise bit the "(n times p)+1"-th bit, the "(n times p)2"-th bit, ..., up to the "(n+1) times p"-th bit of the m bits). In the present disclosure, the number (count, amount) of groups of p bits is denoted as $N_p$. In general, the number (count, amount) of the groups of p bits (in the plurality of groups of p bits) may be $$N_p = \frac{N}{R}.$$

In general, there may be one or more groups of p bits. That is, the number $N_p$ is in general an integer greater than zero. That is, there may be one or more groups of p bits (i.e., $N_p \geq 1$).

It is noted that the generating of the transmission signal may comprise for each of the $N_p$ groups of p bits: the dividing, the selecting, and the mapping. More specifically, the generation of the transmission signal may comprise for each of the $N_p$ groups of p bits: i) dividing the group of p bits into a first subgroup of $p_1$ bits and a second subgroup of $p_2$ bits, ii) selecting, based on the $p_1$ bits, a sequence of modulation schemes from a plurality of predetermined sequences of modulation schemes, and iii) mapping the $p_2$ bits onto R subcarriers respectively by means of the R modulation schemes of the selected sequence.

In particular, in the splitting, each of the $N_p$ groups of p bits may be split into a same number of $p_1$ and $p_2$ bits. That is, the first subgroups obtained by splitting the $N_p$ groups of p bits may have the same size (number of bits), and the second subgroups obtained by splitting the $N_p$ groups of p bits may have the same size (number of bits). However, the presently disclosed subject matter is not limited thereto as, in general, the $N_p$ groups of p bits may be split into subgroups of different sizes.

Furthermore, in the selecting, for each of the $N_p$ groups of p bits, the modulation scheme may be selected, from the same plurality of predetermined sequences of modulation schemes. However, the presently disclosed subject matter is not limited thereto. In general, each of the $N_p$ groups may have its own/corresponding plurality of predetermined sequences from which a modulation scheme is selected. In general, the $N_p$ groups have the same number, A, of mutually different predetermined sequences from with a sequence is selected. Furthermore, the predetermined sequences of the $N_p$ groups may have the same length R. It is further noted that, for each of the $N_p$ groups of p bits, the selection is based on the first subgroup of $p_1$ bits obtained by splitting the respective group of p bits.

Moreover, in the mapping, the $p_2$ bits of each of the $N_p$ groups are in general mapped onto mutually different R subcarriers. That is, each of the second subgroups obtained by splitting the $N_p$ groups, may be mapped onto a same number, R, of subcarriers. However, these "$N_p$ times R" subcarriers onto which the second subgroups are mapped are, in general, mutually different. It is further noted that, for each of the groups $N_p$ groups, the mapping is performed using sequence of modulation schemes selected for said group (based on the first subgroup of said group).

It is further noted that, in the present disclosure, the number of subcarriers (amount, count) used per (e.g., for each) group of p bits is denoted as R, and the number (amount, count) of subcarriers used for transmitting the $N_p$ groups of p bits is denoted as N. In general, R and N are integers greater than 1.

In general, the m bits may be split into $$N_p = \frac{N}{R}.$$

groups of p bits. It is noted that if m is larger than "N/R times p", only the first "N/2 times p" bits of the m bits may be grouped into the N/R groups of the p bits, and the remaining bits may be transmitted later. For instance, if DCM is used (corresponding to R=2), the m bits may be split into N/2 groups each comprising p bits.

A group of p bits may be separated or divided into two groups, which, in the present disclosure, are respectively referred to as the first subgroup of $p_1$ bits and the second subgroup of $p_2$ bits. For instance, each of the p bits may be put, according to a predetermined or predefined pattern (known to both receiver and transmitter) into either the first or the second subgroup. Accordingly, the sum of $p_1$ and $p_2$ may be $p=p_1+p_2$. For example, the first $p_1$ of the p bits may be put into the first subgroup, and the last $p_2$ of the p bits may be put into the second subgroup.

It is noted that, in the present disclosure, the number (amount, count) of the predetermined sequences is referred to as A, and the number (amount, count) of mutually different modulation schemes appearing in the predetermined sequences (e.g., in all the predetermined combined) is referred to as Q. Furthermore, it is noted that the terms "predetermined sequence" and the term "Mode Activation Pattern" are used interchangeably.

In general, the predetermined sequences may have the same length R, where R is an integer greater than 1. In other words, each predetermined sequence may have the same number of elements (i.e., modulation schemes). It is noted that, in general, the length of the predetermined sequences and the number of subcarrier onto which the groups are mapped may be the same.

In general, the predetermined sequences may be mutually different. For instance, in some embodiments, a Hamming distance between any two sequences of the predetermined sequences may be R. This may be written as $d(I_k,I_l)=R$, for $k \neq l$, where $k \in \{1, 2, \ldots, Q\}$, $l \in \{1, 2, \ldots, Q\}$, d(v,z) denotes the Hamming distance between v and z, and $I_k$ and $I_l$ are two predetermined sequences.

In other words, in some embodiments, for each pair of different predetermined sequences, the Hamming distance is equal to the length of the sequences. That is, any two sequences differ at each position.

Here, the Hamming distance between two sequences of modulation schemes is the number of positions (first, second, ..., last position in the sequence) at which the corresponding modulation schemes are different. In other words, the Hamming distance between a first and a second sequence is the number of positions at which the modulation scheme of the first sequence and the modulation scheme of the second sequence are different. More specifically, the first, the second, ..., and the last modulation scheme of the first sequence is respectively compared with the first, the second, ..., and the last modulation scheme of the second sequence.

However, from singleton bound ($A \leq Q^{R-d+1}$), it may only be possible to generate, from Q different modes, at most A=Q different MAPs, which have a Hamming distance of R. Correspondingly in some embodiments, the number A of the predetermined sequences is smaller than or equal to a number, Q, of mutually different modulation schemes appearing in the predetermined sequences.

In some embodiments (in particular, when DCM is used), each of the predetermined sequences has length R=2. In other words, if DCM is applied over two subcarriers, the length of an/each MAP may be 2 (in other words, the diversity order of 2). Furthermore, in some of the embodiments having R=2, the Hamming distance between any two sequences is 2. In other words, in some embodiments, the condition $d(I_k,I_l)=2$, is satisfied for all $k \neq l$.

In some embodiments, each of the predetermined sequences $I_k$, $1 \leq k \leq A \leq Q$, is given as: $I_k = \{X_{\pi_{1(k)}}, X_{\pi_{2(k)}}, \ldots, X_{\pi_{R(k)}}\}$, wherein the $X_i$, $1 \leq i \leq Q$, are the Q mutually different modulation schemes, and the $\pi_j$, $1 \leq j \leq R$, are R permutations (e.g., re-orderings) of $\{1, 2, \ldots, Q\}$.

For example, Q MAPs with a Hamming distance of R may be given as ($1 \leq k \leq Q$):

$$I_k = \{X_k, X_k, \ldots, X_k\}$$

By introducing $I^n = \{i_1^n, i_2^n, \ldots, i_R^n\}$, where the $i_j^i$, with $1 \leq i_j^i \leq Q$, represent the mode indices of the corresponding predetermined sequence $I_n = \{X_{i_1^n}, X_{i_2^n}, \ldots, X_{i_R^n}\}$, this may also be written as $I^k = \{k, k, \ldots, k\}$. Another example for Q MAPs with a Hamming distance of R is given as $$I^k = (k, k+1, \ldots, Q, 1, 2 \ldots, Q, 1, 2 \ldots, R)$$

Furthermore, in some embodiments with R=2 (DCM), the possible MAPs are obtained as $I^a = (a, b)$, where $a \in \{1, \ldots, Q\}$, and $$b = -(a \bmod(-(Q+1))) = -a \bmod(Q+1) = Q+1-a$$

Modulation Schemes (Also Referred to as Modes or Constellations)

In general, each modulation scheme $X_k$ appearing in the predetermined sequences has a same number (amount, count), M, of symbols. In other word, each modulation scheme $X_k$ is a set of symbols of size M. Furthermore, the Q mutually different modulation schemes may be such that they do not have an overlap in terms of symbols. In other words, there is no symbol appearing in more than one of the Q mutually different modulation schemes. This may be written as $X_k \cap X_l = \emptyset$, $k \in \{1, \ldots, Q\}$, $l \in \{1, \ldots, Q\}$, for all $k \neq l$. Using non-overlapping modes may enable easier detection of the modes, by the receiver (e.g., by its circuitry) of the modulation schemes selected by the transmitter (e.g., by its circuitry).

In some embodiments, the modulation schemes appearing in the predetermined sequences can be obtained by partitioning of a Phase Shift Keying (PSK) or Quadrature Amplitude Modulation (QAM) scheme into groups of with M symbols, and/or are mutually related by a rotation in the complex plane.

Figure 6:
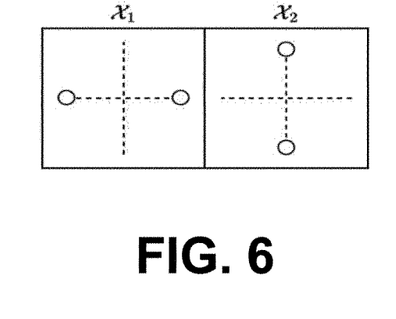
FIG. 6 is a schematic drawing illustrating BPSK and a rotated BPSK constellations.

For instance, the modulation schemes (or modes) comprise Binary Phase Shift Keying (BPSK) and a Quadrature Binary Phase Shift Keying (QBPSK). This is illustrated in FIG. 6: two modes for BPSK constellations can be obtained by the original BPSK symbols and its rotated version as $X_1 = \{1, -1\}$ and $X_2 = \{j, -j\}$, respectively (here, j denotes the imaginary unit, i.e., $j^2 = -1$). In other words, the symbols of a first modulation scheme may be the symbols $\{1, -1\}$ of the BPSK, and the symbols of a second modulation may be obtained by rotating the BPSK symbols by $\pi/2$ in the complex plane. The symbols of the first and the second modulation scheme may be obtained by dividing the symbols of a QPSK (or, more generally, of a modulation scheme having 4 symbols) into two groups, each of the two corresponding to one of the first and the second modulation scheme. For example, the first BPSK mapping maps 0 and 1 onto phases 0 and $\pi$, whereas the second BPSK mapping maps 0 and 1 onto phases $\pi/2$ and $3\pi/2$, which correspond to the above mentioned two BPSK constellations. It is noted that the QPSK, and the corresponding two BPSK mappings may be rotated by the same constant angle, e.g. $\pi/4$. Then, the first BPSK mapping maps 0 and 1 onto phases $\pi/2$ and $5\pi/2$, whereas the second BPSK mapping maps 0 and 1 onto phases $3\pi/2$ and $7\pi/2$. These have been examples for how two obtain two modulation schemes (Q=2), each having two symbols (M=2).

For example, for MCS0, two modes may be defined as in FIG. 6 and the MAPs may be $I^1 = (1,2)$ and $I^2 = (2,1)$ to preserve the frequency diversity with $d(I^1, I^2) = d(I_1, I_2) = 2$. Hence, in the present example, a total number of $p_1 = 1$ bits can be transmitted for each pair of subcarriers with the selection of the MAP, which may allow to compensate the reduction in the data rate due to transmitting each group of $p_2 = 1$ bits over each of two subcarriers.

In general (i.e., for $Q \geq 2$ and $M \geq 2$), Q modulation schemes may be obtained by partitioning constellations with at least "Q times M" symbols. For instance, the symbols of 16-QAM may be divided into four groups each having 4 symbols, 8 groups each having 2 symbols, or 2 groups each having 8 symbols. This is not limited to 16-QAM. For instance, the symbols of any QAM (4-QAM, 8-QAM, 16-QAM, 32-QAM, 64-QAM, 256-QAM, etc) or PSK modulation (4-PSK, 8-PSK, 16-PSK, . . . ) may be partitioned.

Alternatively, new modulation schemes may be obtained from a given modulation scheme by rotating the constellation (e.g., by rotating each symbol) in the complex plane. The given modulation and the rotated modulation schemes will have the same number of symbols.

In general, any constellation, in particular any QAM and any PSK modulation, may be rotated to obtain (additional) modulation schemes. However, when obtaining modulation schemes $X_k$, $k \in \{1, \ldots, Q\}$, by rotating a given constellation, one should rotate said given constellation by angles that the condition $X_k \cap X_l = \emptyset$, $k \in \{1, \ldots, Q\}$, $l \in \{1, \ldots, Q\}$, is satisfied for all $k \neq l$.

The selecting of the MAP(s) is performed, for each group of p bits, based on the respective $p_1$ bits, which are the $p_1$ bits obtained by dividing the respective group of p bits into a first and a second subgroup. In particular, the selection may be performed based on the values of said $p_1$ bits. In some embodiments, the values of the $p_1$ bits determine which MAP is selected.

In general, each of the MAPs may correspond to or be associated with a (single) combination of possible values of $p_1$ bits. That is, each MAP may indicate, for each of $p_1$ bits, a corresponding value (e.g., indicates 0 or 1). In particular, in the selecting, a MAP that corresponds to the $p_1$ bits may be selected. The associations between MAPs and values of the $p_1$ bits may be predetermined or predefined, and may be known to both the transmitter and the receiver side. Thus, the selection of the MAP, i.e., choice of which MAP is selected, indicates the values of the $p_1$ bits. Accordingly, at the receiver, the values of the $p_1$ bits may be determined from the employed MAP.

In particular, in some embodiments, the first subgroup is of $p_1 = \log_2 A$ bits. That is, the second group comprises or consists of $p_1 = \log_2 A$ bits. In these embodiments, there is a one-to-one correspondence between the MAPs of the plurality of MAPs from which a MAP is selected and the possible values of $p_1$ bits.

Indicating the second subgroup of bits by means of the choice of the MAP increases the data rate and still allows god error correction. For instance, having at least M different MAPs (e.g., having Q equal to or greater than M) may allow to overcome/compensate the drawback of a halved data rate due to using DCM. In particular, in comparison to DCM, the mapping schemes (or constellations) that are used for the pair of subcarriers (for R=2) are selected according to one or more additional incoming bit. Therefore, by applying index modulation (IM) to constellation modes, the data rate of DCM may be increased while still providing reliable communication by means of an outstanding error performance. For instance, for R=Q=A=2, it may be possible to transmit one additional bit compared to DCM-MCS0 per pair of subcarriers. Furthermore, in particular for R=2, this allows using the established DCM architecture, already used in IEEE 802.11ax wireless standard.

In general, for each of the $N_p$ groups of p bits, the $p_2$ bits are mapped onto R data symbols. This mapping may be performed in accordance with that MAP that has been selected based on the $p_1$ bits of this group of p bits. At this, each of the R data symbols may be obtained by using, for the mapping of the $p_2$ bits, one (e.g., a single one) of the R modulation schemes of the selected MAP. Thus, the R data symbols may respectively correspond to the $p_2$ bits according to the R modulation schemes of the selected MAP. In other words, for each modulation scheme appearing in the selected MAP, the $p_2$ bits are mapped onto that symbol that corresponds, according said modulation scheme, to the $p_2$ bits. This may give a sequence of R symbols, wherein each of those R symbols indicates the $p_2$ bits. Since, each of the modulation schemes has M symbols, the second subgroup may comprise or consist of $p_2 = \log_2 M$ bits.

Furthermore, for each of the $N_p$ groups of p bits, the R data symbols, obtained by mapping the $p_1$ bits of this group onto symbols, may be mapped onto R subcarriers, respectively. In particular, in some embodiments (in particular in those in which the predetermined sequences have length R=2), the $p_1$ bits of each group of p bits are mapped onto two subcarriers. In general, for each of the $N_p$ groups, the R subcarriers onto which the R data symbols are to be mapped, may be predefined or predetermined (e.g., configured by higher-layer signalling) and, in particular, known to the receiver. For instance, in some embodiments, for each n-th group of the $N_p$ groups, the R subcarriers are subcarriers with the indices n, n+N/R, n+2N/R, ..., n+(R-1)N/R. That is, the R subcarriers onto which the R symbols of the n-th group are mapped may be the subcarriers with the indices n, n+N/R, n+2N/R, ..., n+(R-1)N/R.

More specifically, after selecting, based on the values of the $p_1$ bits, a predetermined sequence $I_n = \{X_{i_1^n}, X_{i_2^n}, \ldots, X_{i_R^n}\}$, the $p_2$ bits of the n-th group of p bits are mapped onto R data symbols $x_1^{s_1^n}, x_2^{s_2^n}, \ldots, X_R^{s_R^n}$ using respectively the R modulation schemes $X_{i_1^n}, X_{i_2^n}, \ldots, X_{i_R^n}$ of the selected predetermined sequence $I_n$. In particular, the same $p_2$ bits of the n-th group may be mapped onto each of said R data symbols. Here, $s_i^n$ is the indices of the i-th subcarrier used for transmitting the symbols of the n-th group any may be used distinguish the R data symbols of different groups of the p bits.

The mapping may be performed in accordance with the selected MAP. That is, the order of the R modulation schemes in the MAP may determine which of the R obtained data symbols is mapped onto which of the R subcarriers. For instance, the symbol obtained by using the first modulation scheme (MS) of the MAP may be mapped onto the subcarrier with the lowest index among the indices of the R subcarriers, the symbol obtained by using the second MS may be mapped onto the subcarrier with a second-lowest index among the R subcarriers, and so forth.

Figure 5:
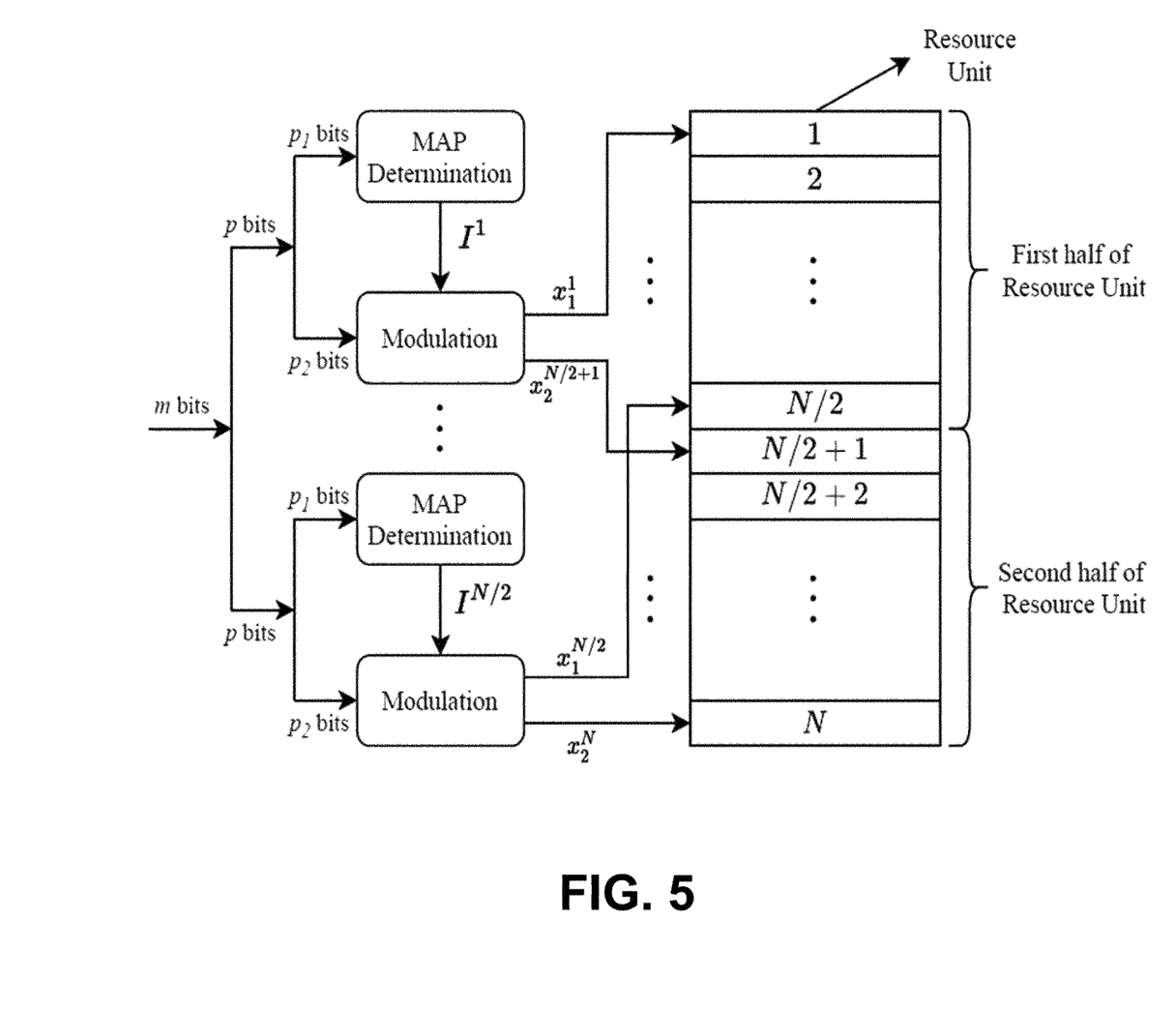
FIG. 5 is a schematic drawing illustrating the mapping on Resource Units according to an exemplary embodiment.

In general, after determining the MAP(s), the same processes may be performed as in DCM. This is illustrated in FIG. 5, which shows an exemplary mapping. As illustrated in FIG. 5, there are N/2 groups of p bits (only the first and N/2-th group are illustrated explicitly, the other groups are indicated by the dots). Each group of the p bits (more specifically, the $p_2$ bits of each group), is mapped onto two (R=2) subcarriers. That is, the RU may be formed by mapping the $p_2$ bits of each of the N/2 groups of p bits onto two (R=2) subcarriers.

More specifically, the $p_2$ bits of the n-th group of the p bits are mapped onto data symbols $x^n = [x_1^n, x_2^m]^T$, where $(\cdot)^T$ denotes transposition. For this, the modulation schemes of the MAP that has been selected, based on the $p_1$ bits of the n-th group, are used (in FIG. 5, this selected MAP is denoted as $I^n$). In particular, the first data symbol $x_1^n$ may be obtained by using the first modulation scheme of said MAP, and the second data symbol $x_2^m$ may be obtained by using the second modulation scheme of said MAP. In other words, the data symbols $x_1^n$ and $x_2^m$ are obtained by mapping the same $p_2$ bits using the first and the second modulation scheme of the selected MAP, respectively.

For instance, the $p_1$ bits of the n-th group of p bits may determine the MAP $I^n = (i_1^n, i_2^m)$, where n=1, ..., N/2, and $i_1^n$ and $i_1^m$ represent the mode indices that are employed over the n-th and m-th subcarriers, respectively. Accordingly, after determining/selecting the MAP $I^n$, the $p_2$ bits of the n-th group are mapped using the modes (constellations) $X_{i_1^n}$ and $X_{i_1^m}$ onto the data symbols $x_{i_1^n}$ and $x_{i_2^m}$.

In the example illustrated in FIG. 5, the data symbols $x_{i_1^n}$, $x_{i_2^m}$ obtained by mapping the $p_2$ bits the n-th group are placed into the Resource Unit (RU) with the indices n and m=n+N/2, respectively. In other words, the data symbols $x_{i_1^n}, x_{i_2^m}$ are mapped in the subcarriers with indices n and m=n+N/2, respectively. The RU may be constructed by performing this processes for all n=N/2 groups of p bits.

Figure 3B:
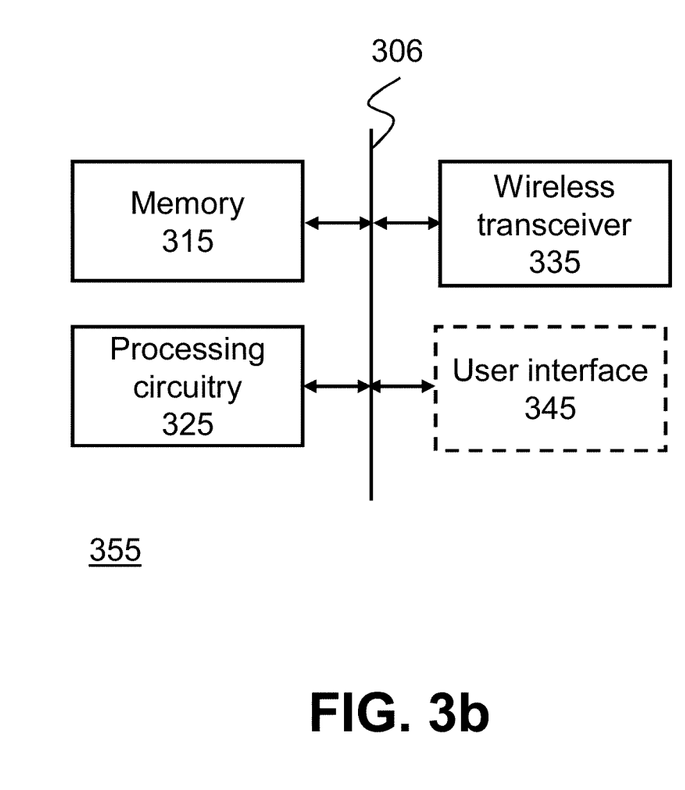
FIG. 3b is a block diagram illustrating a receiving device.

FIG. 3b illustrates a receiving device 355 according to some exemplary embodiments. The receiving device 355 comprises memory 315, processing circuitry 325, and a wireless transceiver 335 (or a wireless receiver 330), which may be capable of communicating with each other via a bus 306. The receiving device 355 may further comprise a user interface 345. However, for some applications, the user interface 345 is not necessary (for instance some devices for machine-to-machine communications or the like).

The transceiver/receiver 335, in operation, receives a transmission signal. The processing circuitry 325 may comprise one or more processors, which, in operation, obtains, from the received transmission signal, $p=p_1+p_2$ bits, wherein $p_1$ and $p_2$ are integers greater than zero. The obtaining comprises determining, by performing maximum likelihood estimation on the received transmission signal a first subgroup of $p_1$ bits and a second subgroup of $p_2$ bits. The $p_2$ bits are mapped (e.g., have been mapped by the transmitting device that transmitted the received signal) onto R subcarriers respectively by means of the R modulation schemes of a sequence of modulation schemes. Furthermore, R is an integer greater than 1, and the sequence is a sequence of a plurality of predetermined sequences of modulation schemes. Moreover, the predetermined sequences are mutually different, and each of the predetermined sequences has length R and indicates the $p_1$ bits.

Figure 4B:
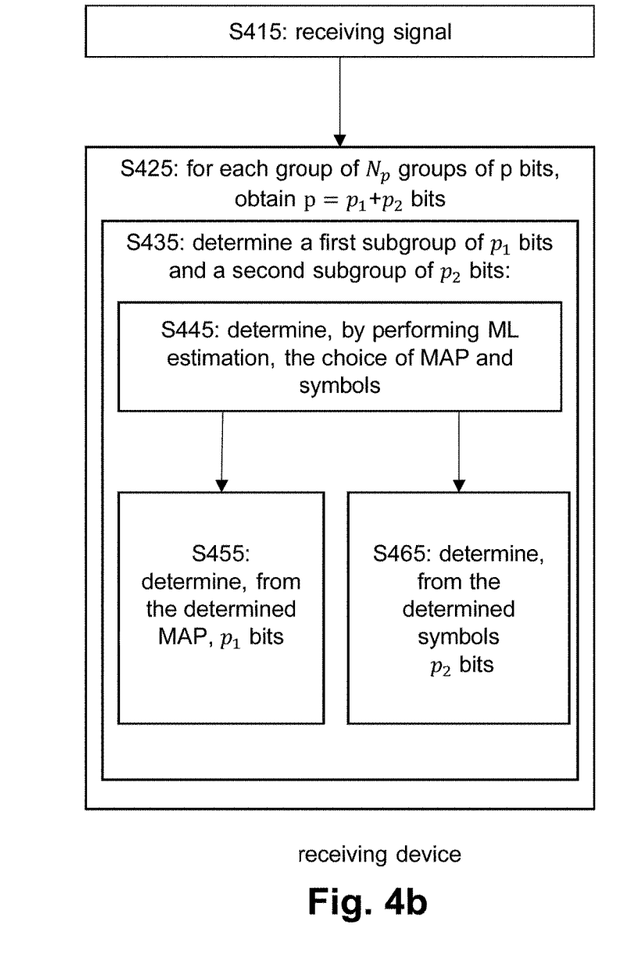
FIG. 4b is a flow diagram illustrating exemplary steps performed by a receiving device.

In correspondence with the above described receiving device, a communication method for wireless reception to be performed by a receiving device is provided. As illustrated in FIG. 4b, the method comprises a step S415 of receiving a transmission signal. The method further comprises a step of obtaining S425, from the received transmission signal, $p=p_1+p_2$ bits, wherein $p_1$ and $p_2$ are integers greater than zero. It is noted that, as also indicated in FIG. 4b, the step S425 of obtaining p bits may be performed for each of the $N_p$ groups of p bits. This step of obtaining S425 comprises a step of determining S435, by performing S445 maximum likelihood estimation on the received transmission signal a first subgroup of $p_1$ bits and a second subgroup of $p_2$ bits. More specifically, by performing S445 ML detection/estimation, a MAP $\hat{I}^n$ and symbols $\hat{x}^n$ may be determined or estimated. Here, the superscript "n" is an index of the group of p bits, for which step S425 is currently performed. In general, the ML detection/estimation is performed based on the received signal. For instance, the ML detection may be based on the symbols $Y^n$ received in the R subcarriers associated with the respective group of p bits. It is noted that the symbols $\hat{x}^n$ may comprise a symbol for each of said R subcarriers. Accordingly, by means of the ML detection, for each of the R subcarriers associated with the respective group of p bits, a symbol may be estimated/determined.

It is further noted that the MAP determined in the ML detection is one of A predetermined MAPs $I_k$. As already mentioned above, these predetermined MAPs may be known to the transmitter and the receiver (for instance, they may be defined in a standard or configured by a higher-layer signalling).

Furthermore, the step of obtaining S435 may comprise a step of determining S455, from the MAP (e.g., from the choice of the MAP In among the A predetermined MAPs $I_k$, $2 \leq k \leq A$), the $p_1$ bits. Moreover, the step of obtaining S435 may comprise a step of determining S465, from the determined symbols, the $p_2$ bits. This is further explained below.

As described above, the $p_2$ bits are mapped (e.g., have been mapped by the transmitting device that transmitted the received signal) onto R subcarriers respectively by means of the R modulation schemes of a sequence of modulation schemes. The sequence is a sequence of a plurality of predetermined sequences of modulation schemes. Moreover the predetermined sequences are mutually different, and each of the predetermined sequences has length R and indicates the $p_1$ bits. More specifically, each predetermined sequence indicates one combination of values of the $p_1$ bits. That is, each predetermined sequence indicates, for each of $p_1$ bits, a corresponding value (e.g., indicates 0 or 1).

At the receiver, after performing Fast Fourier Transform (FFT), the received signal at the subcarriers n and m=n+N/2, can be given as (for R=2 subcarriers), respectively:

$y^n = h^n x_1^n + w^n$ $y^m = h^m x_2^m + w^m$ where $h^n$ and $h^m$ are the channel fading coefficients of subcarriers n and m, respectively; and $w^n$ and $w^m$ represent the noise samples in the frequency domain. The Maximum Likelihood (ML) detection rule may be exploited S445 to obtain i) the MAP $\hat{I}^n$ that has been selected, based on the $p_1$ bits of the n-th group of the $N_p$ groups of p bits, and ii) the data symbols $\hat{x}^4$ onto which the $p_2$ bits of said n-th group are mapped when using said MAP in according to:

$$(\hat{I}^n, \hat{x}^n) = \underset{I^n, x^n}{\operatorname{argmin}} \|Y^n - H^n x^n\|^2$$

where, assuming for R=2 and that the n-th group uses the subcarriers with indices n and m=n+N/2, $Y^n=[y^n, y^m]^T$, $H^n=\operatorname{diag}([h^n, h^m]^T)$, $\operatorname{diag}(\cdot)$ represents diagonalization operation, and $x^n=[x_1^n, x_2^m]^T$ comprises the data symbols $x_1^n$ and $x_2^m$ as explained above.

In general ($R \geq 2$ and any mapping pattern of the $N_p$ groups onto subcarriers), $$Y^n = [y^{s_1^n}, y^{s_2^n}, \ldots, y^{s_R^n}]^T,$$

$$x^n = [x_1^{s_1^n}, x_2^{s_2^n}, \ldots, x_R^{s_R^n}]^T,$$

$$\hat{x}^n = [\hat{x}_1^{s_1^n}, \hat{x}_2^{s_1^n}, \ldots, \hat{x}_R^{s_1^n}]^T,$$

$$\text{and } H^n = \operatorname{diag}([h^{s_1^n}, h^{s_2^n}, \ldots, h^{s_R^n}]^T),$$

where $s_i^n$ is the indices of the i-th subcarrier used for transmitting the symbols of the n-th group, and $y^{s_i^n} = h^{s_i^n} = h^{s_i^n} x_i^{s_i^n} + w^{s_i^n}$ is the signal received at the subcarrier with index $s_i^n$.

For instance, a joint determination of the MAP In and the symbols $\hat{x}^4$ may be performed based on a ML detection according to $$\hat{x}^n = \underset{x^n \in X^k}{\operatorname{argmin}} \|Y^n - H^n x^n\|^2,$$

where each $X^k$ comprises all sequences of symbols corresponding to (or consistent with) the MAP $I_k = X_{i_1}^k$, $X_{i_2}^k, \ldots, X_{i_R}^k$.

Mathematically, this may be expressed as $X^k = X_{i_1}^k \times X_{i_2}^k \times \ldots \times X_{i_R}^k$, where "x" denotes the Cartesian product. Since the MAPs $I_k$ are mutually different and the different modulation schemes $X_i$, $1 \leq i \leq Q$, have no symbols in common, each $x^n$ is only comprised in one of the $X^k$. In other words, there are one-to-one correspondence between the MAPs $I_k$ and the sets of symbol sequences $X^k$. Accordingly, the MAP In used of mapping the $p_2$ bits of the n-th group may be determined as the MAP $I^k$ that corresponds to the sets of symbol sequences $X^k$ that comprises the $\hat{x}^n$ by means of the ML detection.

In other words, diag(v) is a diagonal matrix (i.e., a matrix having zeros except on its diagonal elements) with diagonal elements corresponding to the elements of the vector v. It is noted that, the receiver may in general perform a joint ML detection of the MAP(s) $\hat{I}^n$ and the symbols $\hat{x}^n$. However, the presently disclosed subject matter is not limited thereto. For instance, the receiver (e.g., its processing circuitry) may first perform a ML detection to determine MAP(s) employed by the transmitter and, after the MAP(s) have been determined, perform a ML detection of the symbols using the determined MAP(s) $\hat{I}^n$.

In step S455, the $p_1$ bits may be determined from the determined MAP $\hat{I}^n$, determined S435 by means of a ML detection. More specifically, the $p_1$ bits may be determined based on the choice of the MAP $\hat{I}^n$ among the A predetermined MAPs $I_k$, $2 \leq k \leq A$. In other words, the $p_1$ bits may be determined based on which of the A predetermined MAPs has been determined/detected by means of the ML detection.

In particular, each of the A predetermined MAPs may be associated with or correspond to a particular combination (e.g., a single combination) of values of the $p_1$ bits. These association between predetermined MAPs and combinations of values may be known to the transmitter and the receiver (for instance, they may be defined in a standard or configured by a higher-layer signalling). Accordingly, in step S455, it may be determined that the $p_1$ bits have those values that correspond to the detected MAP $\hat{I}''$.

In other words, at the receiver, the $p_1$ bits of a group of p bits may be determined as follows. A ML detection may be performed to determine the MAP that has been used for mapping the $p_2$ bits onto R symbols. In particular, for each group of p bits, the corresponding R subcarriers, onto each of which the $p_2$ bits are mapped, may be known to the receiver. For instance, said corresponding R subcarriers may be predefined (e.g., in a standard) or be signaled/indicated by the transmitter (e.g., by higher layer signalling). Thus, the receiver may determine which of the predetermined MAPs (i.e., which I'') minimizes the above "argmin"-expression for the symbols Y'' received in the R subcarriers. For instance, it may be determined to which of the predetermined MAPs the symbols $\hat{x}''$ that minimize the "argmin"-expression correspond.

Furthermore, in a step S465, the $p_2$ bits may be determined based on or in accordance with the symbols $\hat{x}''$, determined by means of the ML detection. That is, each of the R determined symbols $\hat{x}_1^{s1''}, \hat{x}_2^{s1''}, \ldots, \hat{x}_R^{s1''}$, in general, corresponds to a particular combination (e.g., a single combination) of values of the $p_2$ bits. That is, each of the R determined symbols may indicate, for each of $p_2$ bits, a corresponding value (e.g., indicates 0 or 1).

Accordingly, in step S465, it may be determined that the $p_2$ bits have those values that correspond to the detected symbols $\hat{x}''$. Since the transmitter maps the $p_2$ bits onto each of the R subcarriers, the values of $p_2$ bits may in general correspond to each of the detected symbols. In case that the R determined symbols $\hat{x}_1^{s1''}, \hat{x}_2^{s1''}, \ldots, \hat{x}_R^{s1''}$ do not correspond to the same values of the $p_2$ bits (e.g., due to an imperfect channel), it may for instance be determined that the $p_2$ bits have that combination of values that corresponds to more of the determined symbols $\hat{x}''$ than any other combination of $p_2$ bits.

Figure 7:
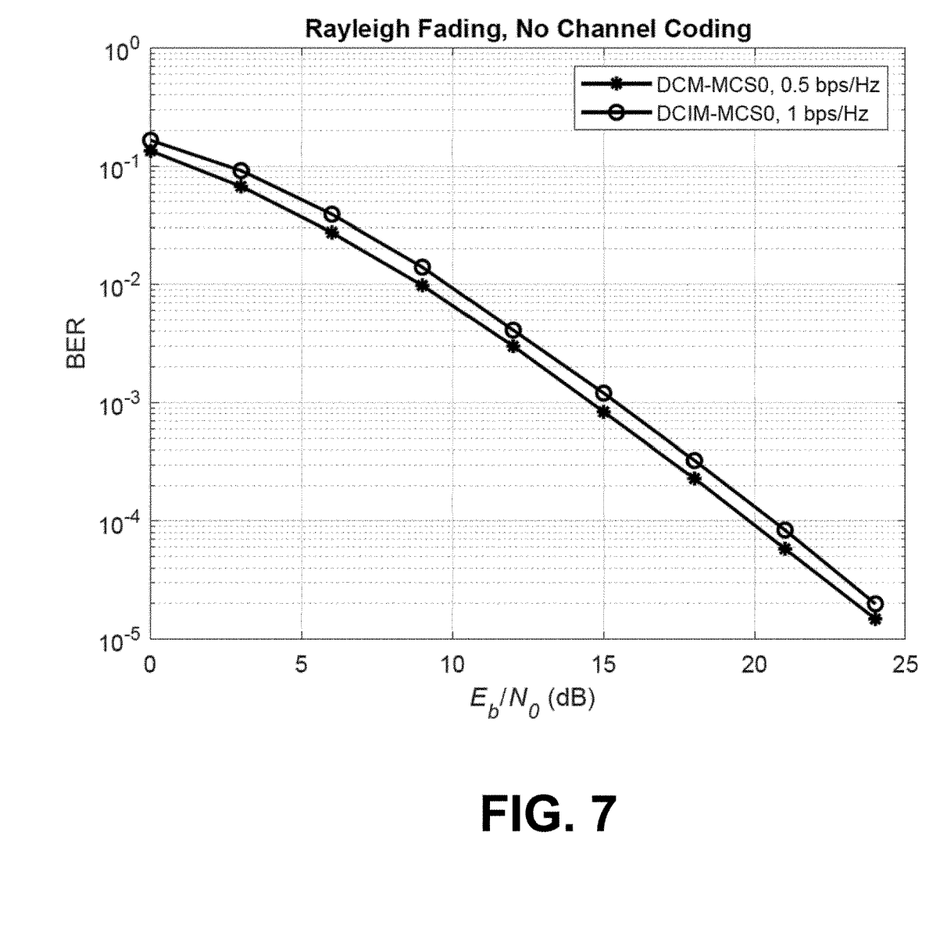
FIG. 7 is a graph showing simulation results illustrating bit error rate for an exemplary implementation.

The method described above with reference to FIG. 5 (denoted as DCIM-MCS0, E standing for enhanced) provides only a slightly worse error performance than the DCM-MCS0 described with reference to FIG. 2, while doubling the data rate, as can be seen in FIG. 7. FIG. 7 shows simulation results in terms of the bit error rate (BER) in Rayleigh channel without additional coding. While the spectral efficiency of DCM-MCS0 is ½ $\log_2 2 = 0.5$ bps/Hz, the spectral efficiency of the proposed method is $\log_2 2 = 1$ bps/Hz. As can be seen from the figure, alongside the doubling of the spectral efficiency, the DCIM-MCS0 may still provide an outstanding error performance. Here, SNR refers to the Signal to Noise Ratio per bit, defined as $E_B/N_0$, where $E_B$ is the signal energy per bit and $N_0$ is the noise spectral density.

Figure 8:
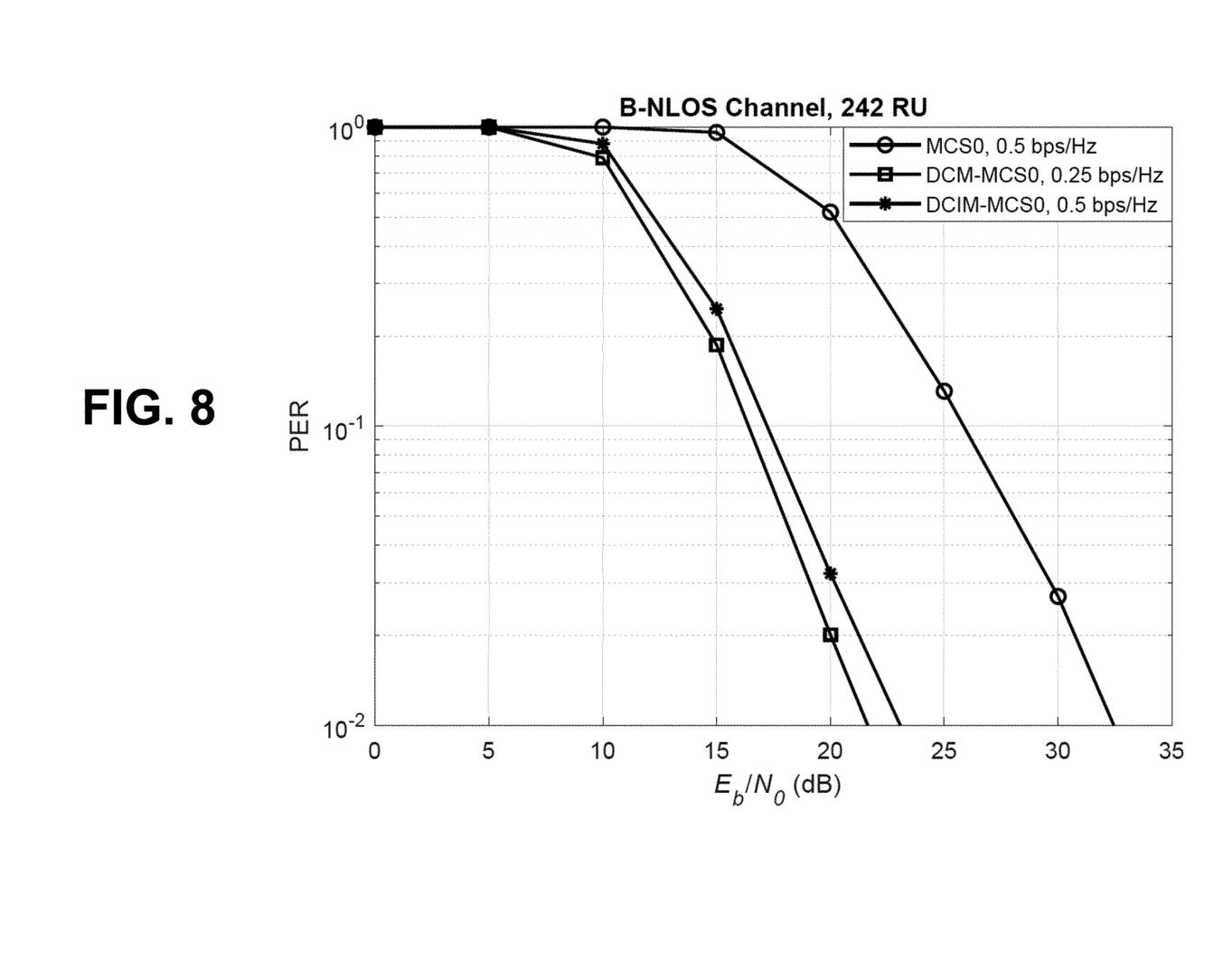
FIG. 8 is a graph showing simulation results illustrating packet error rate for an exemplary implementation.

FIG. 8 shows results of a simulation of packet error rate (PER) performance of MCS0, DCM-MCS0, and the exemplary implementation described with reference to FIG. 5. The channel model used in the simulation was channel model B with coding, in particular with a convolutional coding (CC) with coding rate 1/2. Furthermore, in the simulation, a packet comprised 960 byte information. As can be seen from the simulation results, the DCIM-MCS0 provides the same data rate as MCS0 while providing much better error performance. Furthermore, the simulation results show that the error performances of DCM-MCS0 and DCIM-MCS0 is rather close, and that DCIM provides a much higher spectral efficiency than DCM-MCS0. As in FIG. 7, SNR is per bit and defined as $E_B/N_0$.

As can be seen from the description above, some embodiments of the present disclosure may provide a relatively simple structure mapping modulation symbols on respective frequencies.

Moreover, the present disclosure is not limited to selection of two modulation schemes. In some embodiments, more than two modulation schemes can be exploited, thus increasing flexibility in terms of mode selection.

In some embodiments, the processing circuitry performing the functions described herein may be integrated within an integrated circuit on a single chip. The output of the processing circuitry is the combined signal in time domain. It may be a discrete signal, which the processing circuitry may provide to a transceiver 330 for transmission. The processing circuitry may also implement a control function to control the transceiver 330 to transmit the signal. The transceiver 330 is configured (e.g. by the processing circuitry) to transmit a signal by means of symbols carrying the generated signal. For example, the processing circuitry 320 may configure (control) the transceiver 330, over the bus 301, to transmit the signal. The transceiver may be, for example a wireless transceiver.

As mentioned above, the program code may cause the processing circuitry (e.g. comprising one or more processors) to operate as a special purpose computer programmed to perform the techniques disclosed herein. The memory 310 is shown in FIG. 3A to be separated from the processing circuitry. However, this is only an example. In general, the memory 310 may be implemented within the processing circuitry, and e.g., within the one or more processors. The term "memory" refers to any type of long term, short term, volatile, nonvolatile, or other memory and is not to be limited to any particular type of memory or number of memories, or type of media upon which memory is stored.

The methodologies described herein (at the transmitter side and the received side) may be implemented by various means depending upon the application. For example, these methodologies may be implemented in hardware, operation system, firmware, software, or any combination of two or all of them. For a hardware implementation, any processing circuitry may be used, which may comprise one or more processors. For example, the hardware may comprise one or more of application specific integrated circuits (ASICs), digital signal processors (DSPs), digital signal processing devices (DSPDs), programmable logic devices (PLDs), field programmable gate arrays (FPGAs), processors, controllers, any electronic devices, or other electronic circuitry units or elements designed to perform the functions described above.

If implemented as program code, the functions performed by the transmitting apparatus (device) may be stored as one or more instructions or code on a non-transitory computer readable storage medium such as the memory 310 or any other type of storage. The computer-readable media comprises physical computer storage media, which may be any available medium that can be accessed by the computer, or, in general by the processing circuitry 320. Such computer-readable media may comprise RAM, ROM, EEPROM, optical disk storage, magnetic disk storage, semiconductor storage, or other storage devices. Some particular and non-limiting examples comprise compact disc (CD), CD-ROM, laser disc, optical disc, digital versatile disc (DVD), Blu-ray (BD) disc or the like. Combinations of different storage media are also possible—in other words, distributed and heterogeneous storage may be employed.

The embodiments and exemplary implementations mentioned above show some non-limiting examples. It is understood that various modifications may be made without departing from the disclosed subject matter. For example, modifications may be made to adapt the examples to new systems and scenarios without departing from the central concept described herein. In particular, the above embodiments and exemplary implementations are multiple-input multiple-output (MIMO) compatible and can be applied to all MCSs.

Summarizing, methods and techniques are described for increasing data rate at a high error performance in wireless transmission. A plurality of groups of p bits, wherein p is an integer greater than 1, is obtained. Furthermore, a transmission signal is generated. The generation of the transmission signal comprises, for a group of p bits dividing the group of p bits into a first subgroup of $p_1$ bits and a second subgroup of $p_2$ bits, wherein $p_1$ and $p_2$ are integers greater than zero. Furthermore, based on the $p_1$ bits, a sequence of modulation schemes is selected from a plurality of predetermined sequences of modulation schemes. The predetermined sequences are mutually different, and each of the predetermined sequences has length R, wherein R is an integer greater than 1. Moreover, the $p_2$ bits onto R subcarriers are mapped respectively by means of the R modulation schemes of the selected sequence. Finally, the generated transmission signal is transmitted.

A method for wireless transmission is provided, the method comprising the steps of: i) obtaining a plurality of groups of p bits, wherein p is an integer greater than 1; ii) generating a transmission signal comprising, for a group of p bits: dividing the group of p bits into a first subgroup of $p_1$ bits and a second subgroup of $p_2$ bits, wherein $p_1$ and $p_2$ are integers greater than zero; selecting, based on the $p_1$ bits, a sequence of modulation schemes from a plurality of predetermined sequences of modulation schemes, wherein: the predetermined sequences are mutually different, each of the predetermined sequences has length R, and R is an integer greater than 1; and mapping the $p_2$ bits onto R subcarriers respectively by means of the R modulation schemes of the selected sequence; and iii) transmitting the generated transmission signal.

In some embodiments, each of the predetermined sequences has length R=2.

In some embodiments, the first subgroup is of $p_1=\log_2 A$ bits, wherein A is the number of the predetermined sequences; and each modulation scheme appearing in the predetermined sequences has a same number, M, of symbols, and the second subgroup is of $p_2=\log_2 M$ bits.

In some embodiments, the Hamming distance between any two sequences of the predetermined sequences is R; and/or the number A of the predetermined sequences is smaller than or equal to a number, Q, of mutually different modulation schemes appearing in the predetermined sequences.

For example, each of the predetermined sequences $I_k$, $1 \leq k \leq A \leq Q$, is given as: $I_k = \{X_{\pi_{1(k)}}, X_{\pi_{2(k)}}, \ldots, X_{\pi_{R(k)}}\}$, wherein the $X_i$, $1 \leq i \leq Q$, are the Q mutually different modulation schemes, and the $\pi_j$, $1 \leq j \leq R$, are R permutations of $\{1, 2, \ldots, Q\}$.

In some embodiments, the modulation schemes appearing in the predetermined sequences: can be obtained by partitioning of a Phase Shift Keying or a Quadrature Amplitude Modulation scheme into groups of with M symbols; and/or are mutually related by a rotation in the complex plane.

For example, the modulation schemes comprise Binary Phase Shift Keying, BPSK, and Quadrature Binary Phase Shift Keying, QBPSK.

In some embodiments, the number of the plurality of groups of p bits is $$N_p = \frac{N}{R},$$

wherein N is a number of subcarrier used for transmitting the $N_p$ groups of p bits; and/or the generating of the transmission signal comprises for each of the $N_p$ groups of p bits, the dividing, the selecting, and the mapping.

In some embodiments, for each n-th group of the $N_p$ groups, the R subcarriers are subcarriers with the indices n, n+N/R, n+2N/R, ..., n+(R−1)N/R.

A method is provided for wireless reception, the method comprising the steps of: i) receiving a transmission signal; and ii) obtaining, from the received signal, $p=p_1+p_2$ bits, wherein $p_1$ and $p_2$ are integers greater than zero, comprising determining, by performing maximum likelihood estimation on the received transmission signal a first subgroup of $p_1$ bits and a second subgroup of $p_2$ bits, wherein: the $p_2$ bits are mapped onto R subcarriers respectively by means of R modulation schemes of a sequence of modulation schemes, wherein R is an integer greater than 1; and the sequence is a sequence of a plurality of predetermined sequences of modulation schemes, wherein: the predetermined sequences are mutually different, each of the predetermined sequences has length R and indicates the $p_1$ bits.

In some embodiments, each of the plurality of predetermined sequences has length R=2.

In some embodiments, the first subgroup is of $p_1=\log_2 A$ bits, wherein A is the number of the predetermined sequences; and each modulation scheme appearing in the predetermined sequences has a same number, M, of symbols, and the second subgroup is of $p_2=\log_2 M$ bits.

In some embodiments, the Hamming distance between any two sequences of the predetermined sequences is R; and/or the number A of the predetermined sequences is smaller than or equal to a number, Q, of mutually different modulation schemes appearing in the predetermined sequences.

A transmitting device is provided, the transmitting device comprising circuitry configured to: i) obtain a plurality of groups of p bits, wherein p is an integer greater than 1; ii) generate a transmission signal comprising, for a group of p bits: divide the group of p bits into a first subgroup of $p_1$ bits and a second subgroup of $p_2$ bits, wherein $p_1$ and $p_2$ are integers greater than zero; select, based on the $p_1$ bits, a sequence of modulation schemes from a plurality of predetermined sequences of modulation schemes, wherein: the predetermined sequences are mutually different, each of the predetermined sequences has length R, and R is an integer greater than 1; and iii) map the $p_2$ bits onto R subcarriers respectively by means of the R modulation schemes of the selected sequence. Furthermore, the transmitting device comprises a transmitter configured to transmit the generated transmission signal.

A receiving device, is provided, the receiving device comprising a receiver configured to receive a transmission signal. Furthermore, the receiving device comprises circuitry configured to obtain, from the received signal, $p=p_1+p_2$ bits, wherein $p_1$ and $p_2$ are integers greater than zero, comprising determining, by performing maximum likelihood estimation on the received transmission signal a first subgroup of $p_1$ bits and a second subgroup of $p_2$ bits, wherein: the $p_2$ bits are mapped onto R subcarriers respectively by means of R modulation schemes of a sequence of modulation schemes, wherein R is an integer greater than 1; and the sequence is a sequence of a plurality of predetermined sequences of modulation schemes, wherein the predetermined sequences are mutually different, each of the predetermined sequences has length R and indicates the $p_1$ bits.

Still further, a computer program is provided, stored on a non-transitory medium, and comprising code instructions which when executed by a computer or by a processing circuitry, performs steps of any of the above-mentioned methods.

According to some embodiments, the processing circuitry and/or the transceiver is embedded in an integrated circuit, IC.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the disclosed subject matter. For example, it is to be understood that the presently disclosed subject matter contemplates that, to the extent possible, one or more features of any embodiment can be combined with one or more features of any other embodiment.

The invention claimed is:

1. A method for wireless transmission, comprising:
   obtaining a plurality of groups of p bits, wherein p is an integer greater than 1;
   generating a transmission signal comprising, for a group of p bits:
   dividing the group of p bits into a first subgroup of $p_1$ bits and a second subgroup of $p_2$ bits, wherein $p_1$ and $p_2$ are integers greater than zero;
   selecting, based on the $p_1$ bits, a sequence of modulation schemes from a plurality of predetermined sequences of modulation schemes, wherein:
   the predetermined sequences are mutually different, each of the predetermined sequences has length R, and
   R is an integer greater than 1; and
   mapping the $p_2$ bits onto R subcarriers respectively by means of the R modulation schemes of the selected sequence; and
   transmitting the generated transmission signal.

2. The method according to claim 1, wherein each of the predetermined sequences has length R=2.

3. The method according to claim 1, wherein
   the first subgroup is of $p_1=\log_2 A$ bits, wherein A is the number of the predetermined sequences; and
   each modulation scheme appearing in the predetermined sequences has a same number, M, of symbols, and the second subgroup is of $p_2=\log_2 M$ bits.

4. The method according to claim 3, wherein
   a Hamming distance between any two sequences of the predetermined sequences is R; and/or
   the number A of the predetermined sequences is smaller than or equal to a number, Q, of mutually different modulation schemes appearing in the predetermined sequences.

5. The method according to claim 4, wherein
   each of the predetermined sequences $I_k$, $1 \leq k \leq A \leq Q$, is given as:
   $I_k = \{X_{\pi_{1(k)}}, X_{\pi_{2(k)}}, \ldots, X_{\pi_{R(k)}}\}$, wherein
   the $X_i$, $1 \leq i \leq Q$, are the Q mutually different modulation schemes, and
   the $\pi_j$, $1 \leq j \leq R$, are R permutations of $\{1, 2, \ldots, Q\}$.

6. The method according to claim 4, wherein
   the modulation schemes appearing in the predetermined sequences:
   can be obtained by partitioning of a Phase Shift Keying or a Quadrature Amplitude Modulation scheme into groups of with M symbols; and/or
   are mutually related by a rotation in the complex plane.

7. The method according to claim 6, wherein the modulation schemes comprise Binary Phase Shift Keying, BPSK, and Quadrature Binary Phase Shift Keying, QBPSK.

8. The method according to claim 1, wherein
   a number of the plurality of groups of p bits is $$N_p = \frac{N}{R},$$

wherein N is a number of subcarrier used for transmitting the $N_p$ groups of p bits; and/or
the generating of the transmission signal comprises for each of the $N_p$ groups of p bits, the dividing, the selecting, and the mapping.

9. The method according to claim 8, wherein
for each n-th group of the $N_p$ groups, the R subcarriers are subcarriers with the indices n, n+N/R, n+2N/R, ..., n+(R−1) N/R.

10. A method for wireless reception, the method comprising:
    receiving a transmission signal; and
    obtaining, from the received signal, $p=p_1+p_2$ bits, wherein $p_1$ and $p_2$ are integers greater than zero, comprising determining, by performing maximum likelihood estimation on the received transmission signal a first subgroup of $p_1$ bits and a second subgroup of $p_2$ bits, wherein:
    the $p_2$ bits are mapped onto R subcarriers respectively by means of R modulation schemes of a sequence of modulation schemes, wherein R is an integer greater than 1; and
    the sequence is a sequence of a plurality of predetermined sequences of modulation schemes, wherein:
    the predetermined sequences are mutually different, and
    each of the predetermined sequences has length R and indicates the $P_1$ bits.

11. The method according to claim 10, wherein
    each of the plurality of predetermined sequences has length R=2.

12. The method according to claim 10, wherein
    the first subgroup is of $p_1=\log_2 A$ bits, wherein A is the number of the predetermined sequences; and
    each modulation scheme appearing in the predetermined sequences has a same number, M, of symbols, and the second subgroup is of $p_2=\log_2 M$ bits.

13. The method according to claim 10, wherein
    a Hamming distance between any two sequences of the predetermined sequences is R; and/or
    the number A of the predetermined sequences is smaller than or equal to a number, Q, of mutually different modulation schemes appearing in the predetermined sequences.

14. A transmitting device, comprising:
    circuitry configured to:
    obtain a plurality of groups of p bits, wherein p is an integer greater than 1;

generate a transmission signal comprising, for a group of p bits:
divide the group of p bits into a first subgroup of $p_1$ bits and a second subgroup of $p_2$ bits, wherein $p_1$ and $p_2$ are integers greater than zero;
select, based on the $p_1$ bits, a sequence of modulation schemes from a plurality of predetermined sequences of modulation schemes, wherein:
the predetermined sequences are mutually different, each of the predetermined sequences has length R, and
R is an integer greater than 1; and
map the $p_2$ bits onto R subcarriers respectively by means of the R modulation schemes of the selected sequence; and
a transmitter configured to transmit the generated transmission signal.

15. A receiving device, comprising:
a receiver configured to receive a transmission signal; and
circuitry configured to:
obtain, from the received signal, $p=p_1+p_2$ bits, wherein $p_1$ and $p_2$ are integers greater than zero, comprising determining, by performing maximum likelihood estimation on the received transmission signal a first subgroup of $p_1$ bits and a second subgroup of $p_2$ bits, wherein:
the $p_2$ bits are mapped onto R subcarriers respectively by means of R modulation schemes of a sequence of modulation schemes, wherein R is an integer greater than 1; and
the sequence is a sequence of a plurality of predetermined sequences of modulation schemes, wherein:
the predetermined sequences are mutually different, each of the predetermined sequences has length R and indicates the $P_1$ bits.

\* \* \* \* \*

UNITED STATES PATENT AND TRADEMARK OFFICE
CERTIFICATE OF CORRECTION

PATENT NO. : 12,166,621 B2
APPLICATION NO. : 18/249778
DATED : December 10, 2024
INVENTOR(S) : Ali Tugberk Dogukan et al.

It is certified that error appears in the above-identified patent and that said Letters Patent is hereby corrected as shown below:

In the Claims

Column 19, Line 64, Claim 5, delete "$I_k = \{X_{\pi_1(k)}, X^{\pi_2(k)},$" and insert -- $I_k = \{X_{\pi_1(k)}, X_{\pi_2(k)},$ --

Column 19, Line 67, Claim 5, delete "{1,2, ... , Q}." and insert -- {1,2, ... . , Q}. --

Column 20, Line 27, Claim 9, delete "n+(R–1) N/R." and insert -- n+(R–1)N/R. --

Column 20, Line 47, Claim 10, delete "$P_1$" and insert -- $p_1$ --

Column 22, Line 17, Claim 15, delete "$P_1$" and insert -- $p_1$ --

Signed and Sealed this
Eighteenth Day of February, 2025

Coke Morgan Stewart
*Acting Director of the United States Patent and Trademark Office*